US010581946B2

(12) United States Patent
Totzke et al.

(10) Patent No.: US 10,581,946 B2
(45) Date of Patent: Mar. 3, 2020

(54) METHOD FOR CONTROLLING A MULTIMEDIA APPLICATION, SOFTWARE PRODUCT AND DEVICE

(71) Applicant: Unify GmbH & Co. KG, München (DE)

(72) Inventors: Jürgen Totzke, Poing (DE); Karl Klug, Miesbach (DE); Viktor Ransmayr, München (DE)

(73) Assignee: Unify GmbH & Co. KG, Munich (DE)

( * ) Notice: Subject to any disclaimer, the term of this patent is extended or adjusted under 35 U.S.C. 154(b) by 292 days.

(21) Appl. No.: 15/505,183

(22) PCT Filed: Aug. 7, 2015

(86) PCT No.: PCT/EP2015/001639
§ 371 (c)(1),
(2) Date: Feb. 20, 2017

(87) PCT Pub. No.: WO2016/037677
PCT Pub. Date: Mar. 17, 2016

(65) Prior Publication Data
US 2017/0272488 A1 Sep. 21, 2017

(30) Foreign Application Priority Data

Aug. 25, 2014 (DE) .......................... 10 2014 012 355

(51) Int. Cl.
*H04L 29/06* (2006.01)
*H04N 21/6377* (2011.01)
(Continued)

(52) U.S. Cl.
CPC ........ *H04L 65/604* (2013.01); *H04L 65/4092* (2013.01); *H04L 65/608* (2013.01);
(Continued)

(58) Field of Classification Search
CPC . H04L 65/604; H04L 65/4092; H04L 65/608; H04L 67/02; H04N 21/2343; H04N 21/41407; H04N 21/4424; H04N 21/6377
(Continued)

(56) References Cited

U.S. PATENT DOCUMENTS 6,442,699 B1 * 8/2002 Nakajima ............. G06F 1/3228
713/320
2004/0196852 A1 * 10/2004 Aksu ................. H04L 29/06027
370/395.21
(Continued)

FOREIGN PATENT DOCUMENTS

DE        19934787 A1    2/2001
DE     102013110613 A1   4/2014
(Continued)

OTHER PUBLICATIONS

Written Opinion of the International Searching Authority for PCT/EP2015/001639 dated Oct. 29, 2015.
(Continued)

*Primary Examiner* — Sm A Rahman
*Assistant Examiner* — Chen-Liang Huang
(74) *Attorney, Agent, or Firm* — Buchanan Ingersoll & Rooney PC

(57) ABSTRACT

A first aspect of the present invention concerns a method for controlling a multimedia application on a terminal, in particular a mobile terminal, wherein multimedia data are received from a remote source and are processed for being presented on a display of the terminal, comprising the steps of: a) detecting an operating state of at least one service component of the terminal concerning the presentation of the data of the multimedia application; b) generating an item of state information characterizing the operating state of the at least one service component; c) generating a message,
(Continued)

comprising: the state information, and/or an item of information characterizing the state information, which characterizes the data density that can be processed as a maximum prescribed by the operating state of the service component for presenting the multimedia data, and/or an instruction to the remote source with respect to the adaptation of the data and/or transmission of the data to the terminal, in order to adapt the data and/or the transmission of the data to the data density that can be processed as a maximum prescribed by the operating state of the service component for presenting the multimedia data; d) transmitting the message to the remote source; e) receiving the multimedia data; and f) processing the multimedia data for presentation on the display of the terminal. The invention also concerns a method for the adaptation and transmission of multimedia data, a software product and a device.

14 Claims, 4 Drawing Sheets

(51) Int. Cl.
H04N 21/2343 (2011.01)
H04N 21/414 (2011.01)
H04N 21/442 (2011.01)
H04L 29/08 (2006.01)

(52) U.S. Cl.
CPC ......... *H04L 67/02* (2013.01); *H04N 21/2343* (2013.01); *H04N 21/41407* (2013.01); *H04N 21/4424* (2013.01); *H04N 21/6377* (2013.01)

(58) Field of Classification Search
USPC .......................................................... 709/219
See application file for complete search history.

(56) References Cited

U.S. PATENT DOCUMENTS

| 2006/0126805 A1* | 6/2006 | Kang ................... G11B 27/10 |
| | | 379/88.13 |
| 2009/0161755 A1 | 6/2009 | Gordon |
| 2010/0235520 A1 | 9/2010 | Attanasio |
| 2010/0281042 A1 | 11/2010 | Windes et al. |
| 2013/0031485 A1 | 1/2013 | Chen et al. |
| 2014/0068436 A1* | 3/2014 | Steiner ................... H04L 65/80 |
| | | 715/719 |
| 2016/0227161 A1* | 8/2016 | Jing ................... H04L 12/1822 |
| 2017/0359625 A1* | 12/2017 | Levine ................... H04N 7/173 |
| 2018/0144368 A1* | 5/2018 | Kruisselbrink .... G06Q 30/0257 |

FOREIGN PATENT DOCUMENTS

| EP | 1187485 A1 | 3/2002 |
| EP | 2271097 A1 | 1/2011 |
| EP | 2738721 A1 | 6/2014 |
| WO | 2013127459 A1 | 9/2013 |

OTHER PUBLICATIONS

International Search Report for PCT/EP2015/001639 dated Oct. 29, 2015.
Wikipedia Definition "Model-view-controller"; https://en-wikipedia.org/w/index.php?title+Model-view-controller&oldid=602065785; Jun. 30, 2015.

* cited by examiner

METHOD FOR CONTROLLING A MULTIMEDIA APPLICATION, SOFTWARE PRODUCT AND DEVICE

CROSS-REFERENCE TO RELATED APPLICATIONS

This application is the United States national stage under 35 U.S.C. § 371 of PCT International Application No. PCT/EP2015/001639, filed on Aug. 7, 2015, and claiming priority to German application no. DE102014012355.3.

BACKGROUND OF THE INVENTION

Field of the Invention

Embodiments relate to methods for controlling a multimedia application, a method for manipulating and transmitting multimedia data, a related software product, and a related device.

Background of the Related Art

Multimedia collaboration, (business) social networks, online games, and the like are increasingly using multiple communication and data channels simultaneously. A newly emerging related technology is WebRTC (RTC stands for Real Time Communication). As long as there is sufficient bandwidth, e.g., on a wired network, it can be used without problems. On the mobile Internet or WLAN (wireless LAN), however, the bandwidth can be limited or reduced by the divided medium and reception interference. In addition, the mobile devices used often have only a limited display area (small screen), which cannot display the simultaneously offered communication and data channels with good resolution.

At present, resource administration and service quality considerations for such bundled multimedia communication forms are still in the early stages, and there is no technical solution yet for the above-described problem. This means that a poor user experience and wastefulness of network resources, whose transmitted contents are nowhere near significantly usable or used, must generally be accepted.

With operating systems such as iOS from Apple or Android, it is known that background applications are stopped if the system hits limits. However, this is a drastic emergency solution that can lead to undesirable behavior of the device.

BRIEF SUMMARY OF THE INVENTION

Embodiments may provide a method, a software product, and a device which are capable of overcoming the aforementioned disadvantages of the prior art, at least in part. Embodiments may provide a method, a software product, and a device allowing optimal use of available network bandwidths, without impairing the user experience.

A first aspect of this invention concerns a method for controlling a multimedia application, in particular on a mobile terminal device, wherein multimedia data are received from a remote source and processed for display on the terminal device's screen, with the following steps:
  (a) detecting an operating status of at least one service component of the terminal device related to the presentation of the data from the multimedia application;
  (b) generating a piece of status information characterizing the operating status of the at least one service component;
  (c) generating a message that comprises:
    the status information, and/or
    a piece of information characterizing the status information, which characterizes the maximum data density that can be processed for presenting the multimedia data based on the operating status of the service component, and/or
    an instruction to the remote source with respect to adapting the data and/or data transmission to the terminal device, in order to adapt the data and/or data transmission to the maximum data density that can be processed for presenting the multimedia data based on the operating status of the service component;
  (d) transmitting the message to the remote source;
  (e) receiving the multimedia data; and
  (f) processing the multimedia data for display on the terminal device's screen.

BRIEF DESCRIPTION OF THE FIGURES

The invention is described below in more detail based on preferred exemplary embodiments and with reference to the figures. In this regard, the figures include.

DETAILED DESCRIPTION OF THE INVENTION

Figure 1:
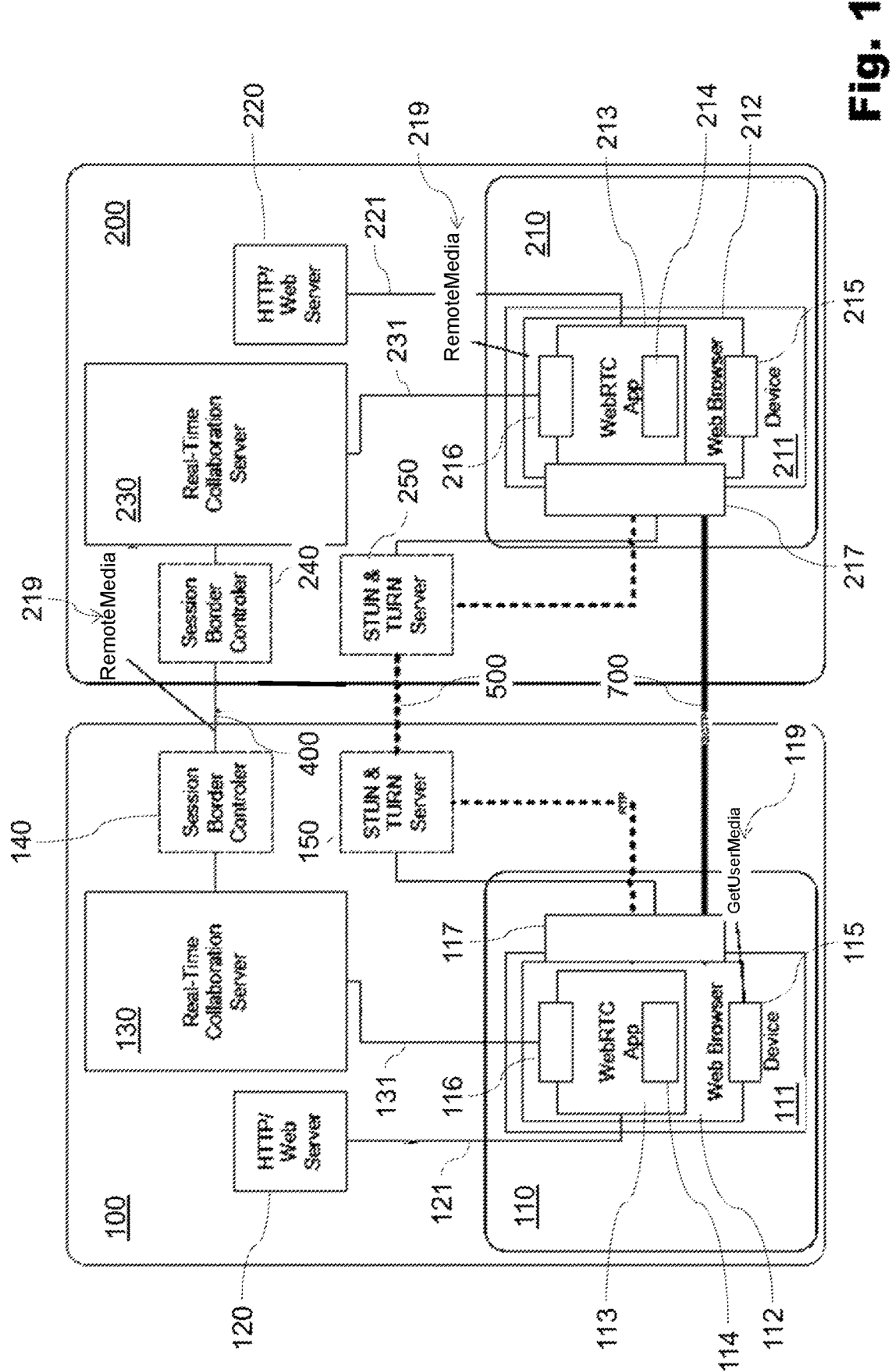
FIG. 1 a schematic diagram of a generic reference architecture with source and sink domains according to one exemplary embodiment of the present invention.

As noted above in the Brief Summary, a first aspect of this invention concerns a method for controlling a multimedia application, in particular on a mobile terminal device, wherein multimedia data are received from a remote source and processed for display on the terminal device's screen, with the following steps:
  (a) detecting an operating status of at least one service component of the terminal device related to the presentation of the data from the multimedia application;
  (b) generating a piece of status information characterizing the operating status of the at least one service component;
  (c) generating a message that comprises:
    the status information, and/or
    a piece of information characterizing the status information, which characterizes the maximum data density that can be processed for presenting the multimedia data based on the operating status of the service component, and/or
    an instruction to the remote source with respect to adapting the data and/or data transmission to the terminal device, in order to adapt the data and/or data transmission to the maximum data density that can be processed for presenting the multimedia data based on the operating status of the service component;
  (d) transmitting the message to the remote source;
  (e) receiving the multimedia data; and
  (f) processing the multimedia data for display on the terminal device's screen.

This invention is based on the fact that a multimedia application includes two sides: a source side or source domain, from which the multimedia contents for the application are generated (and transmitted), and a sink side or sink domain, to which the multimedia contents are forwarded. Essentially, the terminal device can be the sink and a server (download server, storage server, conferencing server), for example, can be the source. However, there can also be transmission points as well as (interim) sinks and (interim) sources. The method for this aspect concerns the sink side, in particular the terminal device side. With the invented method for this aspect, the sending side (the remote source) is able to adapt the generation, editing, and transmission of data based on the status of the service component. This allows for repeated optimal use of the resources on the terminal device side (as well as the source side).

The terminal device is preferably mobile, but stationary applications are also possible. Mobile means, in particular, that the terminal device can communicate using mobile wireless methods. Examples of mobile terminal devices are, for example, smartphones, tablets, laptops. A stationary terminal device such as a PC or similar item means that all or part of the data can additionally or alternatively be transmitted or received via a stationary network. The multimedia data can be processed for display on any screen of the terminal device that is connected to the terminal device and/or built into the terminal device. The detected operating status can be, for example, the simple fact of activating or deactivating the component, but can also include details such as battery status, connected or active displays, or the like. Service components can be, for example, but are not limited to such things as audio reproductions, video reproductions, screen sharing, joint editing, gaming, etc. in hardware and/or software. The service component can be built into and/or installed on the terminal device. According to the invention, the message can include the status information and/or a piece of information characterizing the status information, which characterizes the maximum data density that can be processed for presenting the multimedia data based on the operating status of the service component.

A data density for purposes of the invention can be understood in particular as a data rate. A data rate can be defined in particular as a data volume per unit of time. If the message contains status information, the processing intelligence and decision-making ability of the data source side is engaged and used, which can free up resources on the terminal device side. The transmitted message can be sent to or received by the remote source, for example, via RTC, in particular via a mobile wireless system. If the message contains an instruction, the processing intelligence and decision-making ability of the terminal device side is engaged, which can make the terminal device more independent. If the message presents the information characterizing the status information, which characterizes the maximum data density that can be processed for presenting the multimedia data based on the operating status of the service component, a processing intelligence is engaged at least in large part on the terminal device side, so as to determine the maximum data density that can be processed, while the decisions regarding the measures to be taken in order to adapt the data preparation and transmission to the maximum data density that can be processed are made on the source side.

In other words, in this aspect of the invention, the remote source is also instructed, based on the detected operating status, to transmit (at the most) data with the maximum data density that can be processed by the terminal device. This means that the terminal device receives (at the most) data with the maximum data density that can be processed by the terminal device.

In a further embodiment of the method for this aspect of the invention, the operating status can be determined by a first application programming interface (API, in particular Device API) and the status information can be processed through a second application programming interface (API, in particular Control API), wherein the application to which the second application programming interface is assigned is preferably implemented in a WebRTC-enabled web browser on the terminal device, and wherein preferably the second application programming interface generates the message or authorizes a specifically RTC-enabled server to generate the message. The server can be, in particular, an RTC-enabled communications server. The method can further be configured such that the message is addressed to a remote application programming interface (API, in particular Control API) of the remote source.

In a preferred embodiment of the method for this aspect of the invention, data are displayed according to a design pattern (MVC) with a model (M) containing the data, a view (V) as the presentation layer for displaying the data, and a controller (C) as the control layer for managing the presentation layer, wherein the status information is generated by the controller (C) and wherein the operating status is preferably implemented in the model (M). For the purposes of the MVC design pattern used as part of this invention, a view is a presentation layer that can also handle user interactions. It is aware of its control as well as the model whose data it is presenting, but it is not responsible for further processing of data provided by the user. The presentation can be informed of changes to data in the model by the design pattern's "observer" and can then retrieve the updated data. In addition, for purposes of the MVC design pattern used as part of this invention, a controller is a means of control that manages one or more presentations and also, if necessary, accepts user actions from them, assesses those actions, and acts in response.

Each presentation can have its own means of control. The means of control can also be used to make user actions take effect, e.g., when changing the presentation (e.g., moving the window) or when forwarding to the model (e.g., accepting incoming data or triggering processes). The means of control can also contain mechanisms for limiting user interactions with the presentation. In many implementations, the means of control can also be similar to an "observer" of the model, in order to manipulate the view directly when making changes to data. The preceding explanations of the MVC design pattern are from the Wikipedia entry "Model_View-_Controller," which can be referenced for further understanding. Because, according to the invention, the status information is generated by the controller (C), the existing MVC pattern can be used, wherein the control layer undergoes an expansion.

In an additional example of the method in this embodiment, the second application programming interface can be registered in the design pattern as an additional view for the service components it controls, wherein preferably the operating status is provided through the first application control interface of the model.

In an additional example of the method for this aspect of the invention, the instruction with respect to adapting data and/or transmitting data to the terminal device can concern at least one of the following measures:

terminating or suspending or resuming or initiating a data stream;

reducing or increasing the data density of a data stream;
changing the transmission path for sending a data stream;
sending a different medium instead of the data stream or part of the data stream.

In this additional example, data adaptation and transmission are controlled by the application or by the user on the terminal device side. It is therefore possible, for example, to switch off the display but leave the sound on, when searching briefly for something in a search engine, for example.

A second aspect of this invention concerns a method for controlling the adaptation and transmission of multimedia data to a remote sink, in particular to a preferably mobile terminal device, by means of these steps:

A. receive and decode a message from the remote sink;
B. evaluate the message, in order to detect an operating status of at least one service component affecting the display of the data for the multimedia application on the remote sink side or a maximum data density that can be processed for displaying the multimedia data on the remote sink, based on the operating status of the service component;
C. change the adaptation and/or transmission of the multimedia data, by assessing the detected operating status or maximum data density that can be processed for displaying the multimedia data, by means of at least one of the following measures:
  terminating or suspending or resuming or initiating a data stream of the multimedia data;
  reducing or increasing the data density of the data stream;
  changing the transmission path for sending a data stream;
  sending a replacement medium instead of the data stream or part of the data stream, so as to adapt the data density determined on the remote sink to the maximum data density that can be processed for displaying the multimedia data on the remote sink.

This aspect of the invention affects the sender or source side and is based on the assumption that the decision-making intelligence is located on the sender side. The method for this aspect of the invention is executed by the remote source in the same manner as for the first aspect of the invention. As part of this second aspect of the invention, a remote sink can be a terminal device, in particular the terminal device from the first aspect of the invention, or an intermediate station (e.g., router, telecommunication station, server). Preferably, the message is sent to or received by the remote source, for example, via RTC, in particular via a mobile wireless system.

Alternatively, instead of Steps B and C in the method for this aspect of the invention, an instruction contained in the message can be detected and, depending upon the content of the instruction, can result in
  suspension of a multimedia data transmission while keeping the transmission channel open, or
  reduction of the data density of multimedia data, or
  masking of a data stream of multimedia data by another medium, or
  resumption of a previously suspended transmission or resumption of a previously reduced data density of multimedia data, or
  restoration of a previously masked data stream of multimedia data so as to adapt the data density determined on the remote sink to the maximum data density that can be processed for displaying the multimedia data on the remote sink. With this alternative, the decision-making intelligence can be at least partially received on the sink side.

In a further embodiment of the method for this aspect of the invention, the message can be received by an application programming interface (API, in particular Control API), wherein the application to which the application programming interface is assigned is preferably implemented in a WebRTC-enabled web browser. Also preferably, the multimedia data can be transmitted via an interface other than the application programming interface used to receive the message, in particular a media engine for coding or decoding media data streams on the web browser.

A third aspect of this invention concerns a method for controlling a multimedia application, in particular on a mobile terminal device, wherein multimedia data from the multimedia application are transmitted from a source domain to a sink domain, received by the sink domain, and processed for display on a screen of the terminal device, wherein the multimedia data are adapted and/or transmitted depending upon an operating status of at least one service component of the terminal device affecting the display of the data from the multimedia application, wherein the method preferably includes the method steps from the previously described method according to the first aspect of the invention and/or the previously described method according to the second aspect of the invention. In other words, this aspect of the invention concerns a system that includes the source and sink sides. This aspect of the invention can also ensure that the data are transmitted from the source to the sink (at most) with the maximum data density that can be processed by the terminal device (sink).

A fourth aspect of this invention concerns a software product that is stored on a computer-readable medium and can preferably be installed directly into the internal memory of a computer, and that has the program codes for a computer program enabling a computer to carry out the method steps of at least one of the previously described methods according to the first, second, or third aspect of the invention, when the computer program is run on the computer.

A fifth aspect of this invention concerns a device for executing at least one of the previously described methods according to the first, second, or third aspect of the invention, wherein the device preferably includes in particular a mobile terminal device and/or a server, in particular a gaming server or conferencing server, and/or a conferencing unit, and wherein the device is capable of executing the method, in particular by implementing the software product according to the fourth aspect of the invention.

The invention can also be embodied by a computer program comprising program commands that cause a computer to carry out the method sequences of at least one of the previously described methods according to the first, second, or third aspects of the invention when the computer program is installed or running on the computer, and/or a digital storage medium having electrically readable control signals that can operate with a programmable computer in order to manage communication processes, wherein the control signals are designed and adapted to cause the computer to carry out the method steps of at least one of the previously described methods according to the first, second, or third aspects of the invention.

Additional features, tasks, advantages and details of the present invention will become more apparent from the following description of concrete exemplary embodiments and their representation in drawings in the included figures.

It is understood that features, tasks, advantages and details of individual exemplary embodiments are transferable to other exemplary embodiments and are considered to be disclosed also in connection with the other exemplary embodiments unless this is obviously inapplicable for technical or physical reasons. Accordingly, features of various exemplary embodiments can fundamentally be combined with other exemplary embodiments and the combination can also be considered an exemplary embodiment of the invention.

The figures are schematic only and not necessarily according to scale. The graphic representations and their descriptions are intended to illustrate the principle of the invention and shall in no way restrict the invention. Ideas and concepts that a person skilled in the prior art can understand and use are not explained specifically in the following descriptions, so as not to dilute the main points of the invention.

FIG. 1 shows a generic reference architecture with source and sink domains as one exemplary embodiment of a device according to the present invention.

An originating or source domain (domain 1) 100 has a media source (client media source) 110, an HTTP/web server 120, a real-time collaboration or communication server (real-time collaboration server) 130, a session border controller (SBC) 140, and a STUN&TURN server 150 (STUN/TURN: Session Traversal Utilities for NAT (Network Address Translation)/Traversal Using Relays around NAT). The media source 110 is implemented essentially by a device 111. The device 111 has a web browser 112, in which a WebRTC-enabled application (WebRTC App) 113 is implemented with an MVC (model view controller) design pattern 114. The application 113 is connected via a connection 121, using a suitable protocol such as HTML 5/JS, to the HTTP/Web server 120 and is connected via a device application program interface (device API) 115 to peripheral devices of the device 111. In addition, a control application programming interface (control API) 116 of the application 113 is connected via a connection 131 using a proprietary protocol such as "RESTful over Websockets" (REST: Representational State Transfer) to the communication server 130. The web browser 112 also has a media interface 117 that is connected to the STUN&TURN server 150. For the purposes of this application, the concept of collaboration includes but is not limited to communication.

A target or sink domain (domain 2) 200 whose characteristics are suitable for this invention is configured essentially like the source domain 200. Specifically, the target domain 200 has a media sink (client media sink) 210, an HTTP/Web server 220, a real-time communication server (real-time collaboration server) 230, a session border controller 240, and a STUN&TURN server 250. The media sink 210 is implemented essentially by a device 211. The device 211 has a web browser 212, in which a WebRTC-enabled application (WebRTC App) 213 is implemented with an MVC (model view controller) design pattern 214. The application 213 is connected via a connection 221, using a suitable protocol, to the HTTP/Web server 220 and is connected via a device application program interface (device API) 215 to peripheral devices of the device 211. In addition, a control application programming interface (control API) 216 of the application 213 is connected via a connection 231 to the communication server 230. The web browser 212 also has a media interface 217 that is connected to the STUN&TURN server 250. The protocols used can be the same as the protocols used in the source domain 100.

The collaboration servers 130, 230 are used in conjunction with this invention primarily as communication servers, but can also perform other collaboration functions.

The source domain 100 and the target domain 200 are connected to each other via multiple data connections. First, the communication servers 130, 230 from the source domain 100 and the target domain 200 are connected to each other via a data connection 400, wherein the session border controllers 140, 240 from the source domain 100 and the target domain 200 function respectively as outside interfaces. The data connection 400 uses, for example, session protocol SIP-T or XMPP with SDP Offer/Answer to offer connections to other domains (federation). In addition, the STUN&TURN servers 150, 250 from the source domain 100 and the target domain 200 are connected to each other so as to form an RTP connection 500 between the media interfaces 117, 217 from the source domain 100 and the target domain 200, and the media interfaces 117, 217 from the source domain 100 and the target domain 200 are also connected directly to each other via an SCTP (Stream Control Transmission Protocol) connection 700.

In the preceding exemplary embodiment, the target domain 200 or its device level 211 corresponds to a (mobile) terminal device. The source domain 100 or its device level 111 can be a media server, for example. It should be understood that, in the generic architecture from FIG. 1, individual elements of the respective domains 100, 200 can be located in or outside of the respective physical devices 111, 211.

Figure 2A:
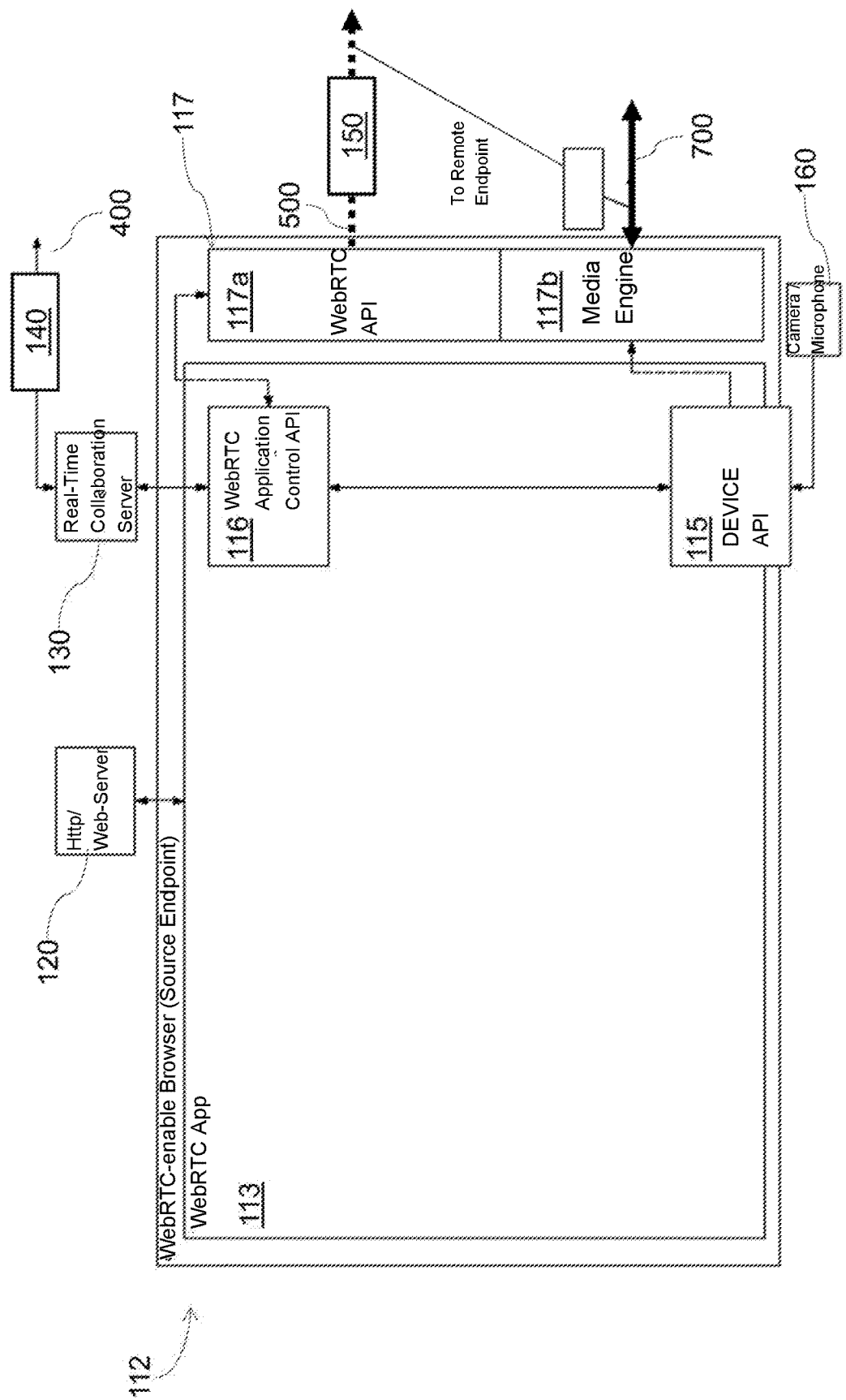
FIG. 2A a schematic diagram of one possible way to integrate a WebRTC application from the exemplary embodiment into a source side implementation.
Figure 2B:
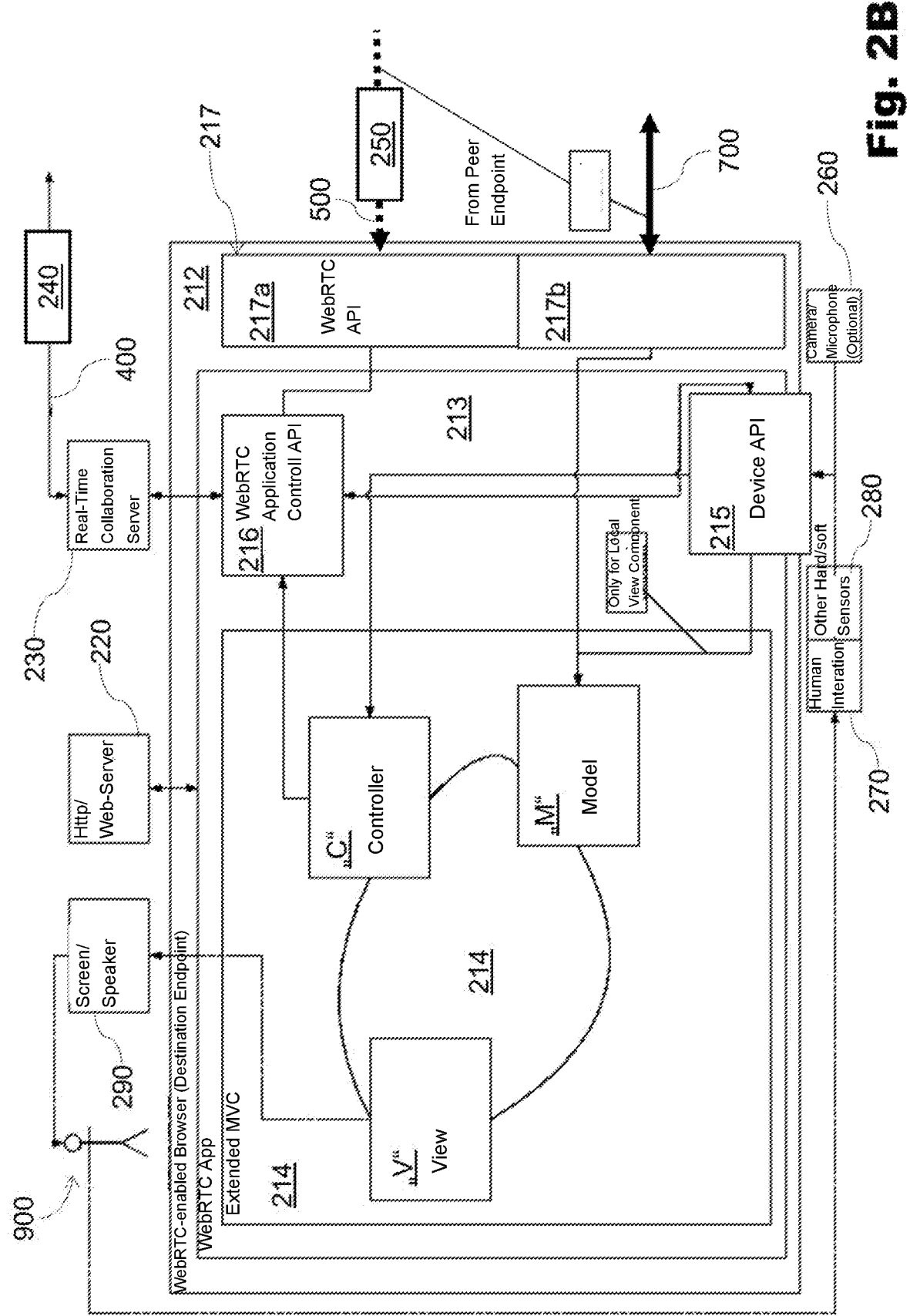
FIG. 2B a schematic diagram of one possible way to integrate a WebRTC application from the exemplary embodiment into a sink side implementation.

FIGS. 2A and 2B illustrate the assembly of the WebRTC browsers 112, 214 from the source domain 100 or the target domain 200 in greater detail. FIG. 2A is a schematic diagram of one possible integration into a source-side implementation of the WebRTC application 113 for this exemplary embodiment, and FIG. 2B is a schematic diagram of one possible integration into a sink-side implementation of the WebRTC application 213 for this exemplary embodiment. FIGS. 2A and 2B can be understood to be details of FIG. 1.

According to the diagram in FIG. 2A, the media interface 117 from the web browser 112 of the source domain 100 has a WebRTC-enabled application programming interface (WebRTC API) 117a and a media engine 117b. The media engine 117b on the side of the source domain 100 can function as an encoder for transmitted media data streams. A camera-microphone unit 160 is connected to the device's application programming interface 115.

Similarly, according to the illustration in FIG. 2B, the media interface 217 from the Web browser 212 for the target domain 200 has a WebRTC-enabled application programming interface (WebRTC API) 217a and a media engine 217b. The media engine 217b on the side of the target domain 200 can function as an decoder for received media data streams. A camera-microphone unit 260, a man-machine interface (human interaction device) 270 for permitting interactions with an operator 900, and other hardware sensors 280 are connected to the device's application programming interface 215.

FIG. 2B also schematically illustrates the expanded MVC design pattern 214 of the WebRTC application 213 for the sink domain 200 and its implementation. The MVC design pattern 214 has a model "M," a view "V," and a controller "C" that have already been described above. The model "M" receives input data from the device API 215 and from the WebRTC media engine 217b. The view "V" controls the display of a view on a screen sound reproduction unit (screen speaker) 290. The controller "C" also receives input data from the device API 215 and delivers output data for the control API 216. The control API 216 is also connected to the WebRTC API 217a and the device API 215.

As shown in FIGS. 2A and 2B, the RTP connection 500 and the SCTP connection 700 are established between the media interface 117 of the WebRTC browser 112 in the source domain 100 and the media interface 217 of the WebRTC browser 212 in the target domain 200. The one-way RTP connection 500, as shown in FIG. 1, runs to the source and sink sides respectively through a STUN&TURN server 150, 250, while the two-way SCTP connection 700 runs directly between the media interfaces 117, 217. The STUN&TURN servers 150, 250 can be omitted in certain embodiment variations or can be limited to the STUN or TURN function. The RTP connection 500 and the SCTP connection 700 are optional, and certain embodiment variations can have only one of them.

Figure 3:
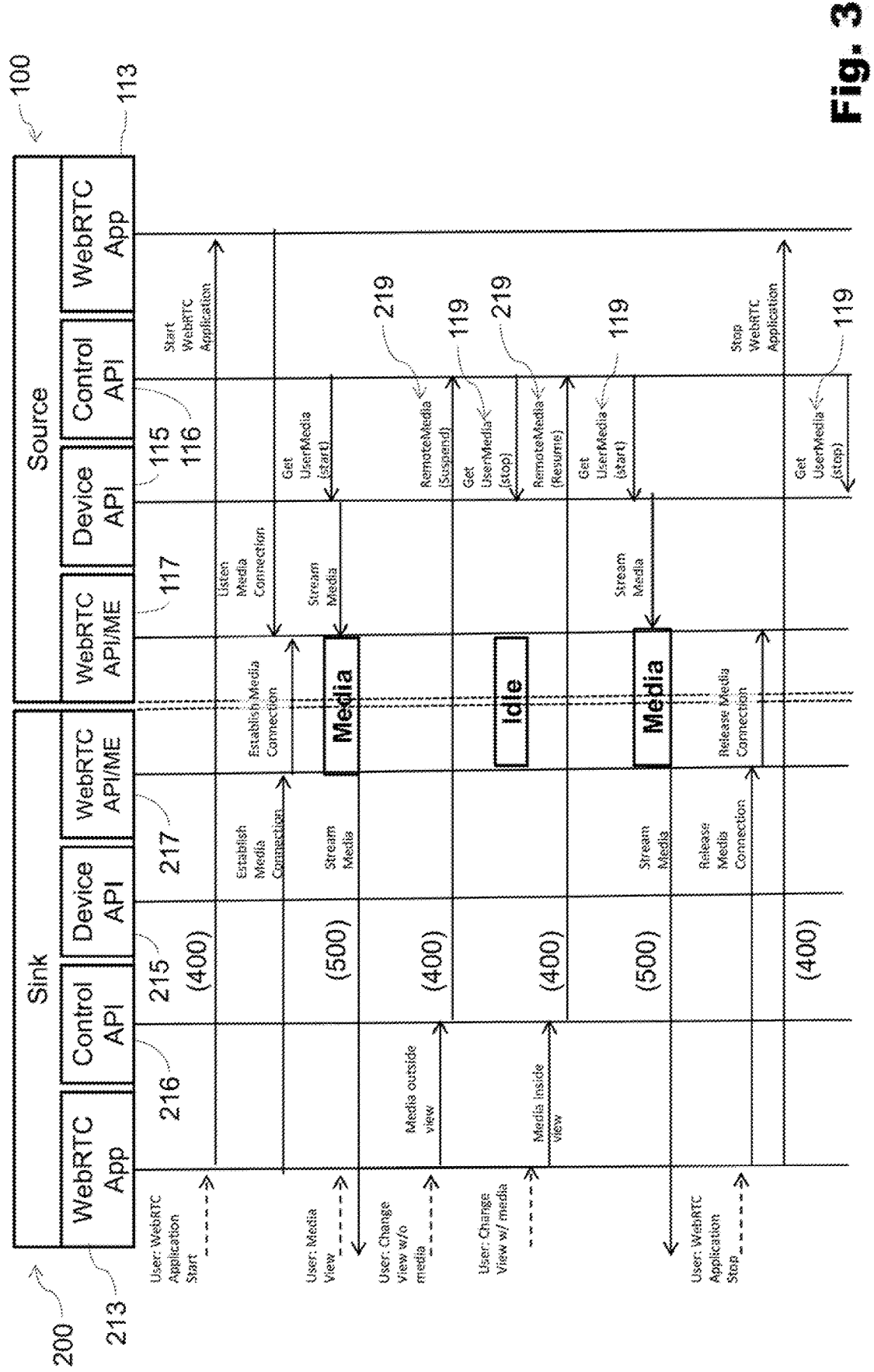
FIG. 3 a flow diagram for a process according to one exemplary embodiment of this invention.

The manner in which the device hardware shown in FIGS. 1, 2A, and 2B functions is also described below in relation to the flow diagram in FIG. 3 as one exemplary embodiment of a method according to this invention.

A specific WebRTC application 213 on the (mobile) terminal device 210 is started by selecting a corresponding URL in an HTML5/JavaScript (JS)-enabled browser 212, and then the appropriate application logic is loaded via JS into the browser 212 by the application server (HTTP/Web server) 220. After that, a Web socket connection 231 to the respective RTC server 130, 230 is established, and the proprietary protocol—usually a protocol configured as RESTful—is started. In an exemplary video telephony with screen-sharing application, the device reception resources for accessing microphone, camera, and graphics cards are started locally through the device API:getUserMedia. Using the proprietary and the session protocol (which runs optionally through one or more session border controllers), the addresses of the remote device 110, with which communication is desired, are transmitted. The shared devices that transmit media as sources, i.e., in the illustrated exemplary embodiment the device 111 of the source domain 100, use the WebRTC API 117 to establish the respective one-way RTP connections 500 for transmitting language, video, and screen-sharing, for example as streamed video, in a forward direction. As described, the bidirectional SCTP connection 700 can be established for certain other media. In the preceding exemplary embodiment, the respective STUN&TURN servers 150, 250 in the RTP channel 500 are involved in establishing the connection. The language, camera animation, and screen animation media received by the device from the source domain are coded according to the coding method generated in the session protocol by the source-side media engine 117b and transmitted through each RTP connection 500 (here again likewise through the STUN&TURN servers 150, 250). The receiving device, i.e., the sink-side media engine 217b, decodes the media stream and presents it through the application logic on the corresponding local device output resources, here speaker and screen as image-sound reproduction unit 290, corresponding to the current user-selected display.

The application logic typically implements the view as a model view controller (MVC) design pattern. Here the MVC controller "C" or the MVC model "M" receives the knowledge via the current view "V." When using the exemplary application—for example, on a smartphone—the video representation and the shared screen cannot be displayed meaningfully on the screen surface at the same time with adequate resolution. The user will therefore change to a desktop sharing view, for example, by means of interaction (human interaction device 270). This is received and obeyed by the MVC 214, so that the camera's moving image is no longer displayed. Consequently, the local expanded control API 216 according to the invention is informed and transmits a RemoteMedia (Suspend) message 219 for this video connection via a callback function, for example, to the local (sink) WebRTC server 230. It forwards this information regarding the selected session protocol 400, expanded according to the invention, to the remote (source) WebRTC server 130. The remote WebRTC server 130 then re-forwards this message to the control API 116 of its locally connected browser 112. The application logic of the local WebRTC app 113 therefore deactivates the media stream from the camera 160, via the local device API 111 using a getUserMedia application 119, but maintains the related RTP connection 500. If needed, the assigned encoder (source-side media engine 117b) generates a replacement medium, for example a still image, requiring significantly less bandwidth. If the user of the receiving device 210 now changes briefly to the video-telephony view, in order to see the conversation partner's facial expression as a critical aspect in the shared presentation, this is detected by the MVC 214 and therefore the expanded local control API 216 according to the invention, by means of a callback function, initiates a RemoteMedia(Resume) message 219 according to the invention for this video connection transmitted to the local (sink) WebRTC server 230. It forwards this information 219 regarding the selected session protocol 400, expanded according to the invention, to the remote (source) WebRTC server 130. The remote WebRTC server 130 then re-forwards this message to the control API 116 of its locally connected browser 112. The application logic of the local WebRTC app 113 therefore deactivates the media stream from the camera 190, via the local device API 115 using getUserMedia 119. The encoder therefore delivers the desired media stream. After a waiting period, if the user is still in the screen-sharing view, a similar process can suspend the screen-sharing transmitted as animation, and so on.

When logging off or leaving the WebRTC application 213, the resources used and the RTP (SCTP) connections are released or terminated regardless of suspension status.

As described, FIG. 2B shows one possible integration into a client-side implementation of a WebRTC application 213 by means of expanding the MVC 214 according to the invention. The invented control API 216 is triggered by the controller "V", if the view "V" has changed in such a way that use of the media streams established via the WebRTC API 217a has changed. Alternatively to view "V," the controller "C" can also propagate signals from the device environment such as display off, low battery, etc. The control API 216 transmits them to the WebRTC server 230, which sends them on to the remote WebRTC server 130 (not shown). Optionally, the received media streams that are part of the model "M" can still be locally switched off. Then the media streams to be sent can then be remotely switched off or modified to save resources by the control API 130. The local device API 216 detects this, and if not already locally specifically processed, the local model "M" is appropriately updated.

In principle, a similar effect could also be represented by SDP:Offer/Answer. This of course requires a considerably higher signaling expenditure, in particular for establishing the RTP connections and for allocating and deallocating the related device resources. The method according to the invention, on the other hand, allows for greater flexibility of the user interaction and therefore an improved user experience.

As described above, an instruction is conveyed by the RemoteMedia{suspend|resume} message 219 to the remote source 100 with respect to adapting the data and/or data transmission to the terminal device 200, in order to adapt the data and/or data transmission to the maximum data density that can be processed for presenting the multimedia data based on the operating status of the service component. This assumes that the application logic and therefore the decision-making intelligence and ability required to execute the invented method is located on the terminal device side (sink domain) 200.

In one variation of the previously described exemplary embodiment, the application logic can also be located at least partially on the source side 100. In this way, instead of the RemoteMedia{suspend|resume} message 219, a message is also generated that contains the status information itself, and the specifications for adapting the data and/or transmitting the data at the maximum data density that can be processed for displaying the multimedia data according to the operating status of the service components can be detected by the WebRTC application 113 of the source 100 and then converted by getUserMedia.

In another variation, the generated message can have a piece of information characterizing the status information, which characterizes the maximum data density that can be processed for presenting the multimedia data based on the operating status of the service component.

If a multimedia application, such as a collaboration conference, is started according to the prior art, the related communication components are also started at the same time. This involves establishing two-way connections for audio-video components, application sharing components, and, if necessary, additional communication channels. As soon as these are established, the data sources start coding the data and communication streams, regardless of whether they are processed by the data sinks and their decoding is displayed. However, if these are not displayed now, unnecessary network bandwidths are used and, in addition, unnecessary energy is used by the sending and receiving device, which shortens the battery life of mobile terminal devices. Typically, on a smartphone or tablet PC with a smaller screen size, a video conference and a remote display cannot be displayed at the same time with adequate resolution.

According to this invention, transmission control on a (mobile) data network with multimedia service components is improved by feedback from user views and interactions on the (mobile) target device (sink domain 200) to the originating device (source domain 100). This saves on both bandwidths in the data network and energy in the terminal and transmission devices involved, thereby prolonging battery lifetimes in mobile terminal devices.

If the terminal devices are connected via conferencing systems, the conferencing systems are used in the sense of the source domains 100 according to the invention and implement adequate functionality in a proprietary manner.

The expanded connection protocols and usage connections of the service components according to the invention can also be controlled via network conversion or proxy devices such as the STUN/TURN server 150, 250. The expanded session protocol according to the invention can optionally be controlled by its SBC 140, 240.

Displays on devices are often implemented with the model-view-controller (MVC) design pattern. In this way, the view via the controller controls which data are displayed, according to user interactions from the model, and inversely the view can be updated by changing data observed by the controller. The MVC implementation pattern can also be used for web applications, native clients, and gadgets. The controller thereby knows which section of the model is actually currently in use. For multimedia applications such as WebRTC, for example, the model includes but is not limited to service components such as audio, video, screen-sharing, joint editing, and gaming. According to the invention, the model knows which components are active and needed based on the view. The controller also has an overview of which service components are active and can therefore generate sensible combinations according to the invention.

If, for example, a screen-sharing application is active and the video conferencing component is inactive because it cannot be displayed, the controller can cause the video connection to be switched off while maintaining continuous use of the audio connection. The expanded model according to the invention with knowledge of active and inactive service components can, according to the invention, provide information for the respective service components, for example, via a control API 216 of the WebRTC app 213 in the client 210, expanded according to the invention, that again triggers the callback function "RemoteMedia{suspend|resume}" 219 according to the invention in the sink real-time communication server (WebRTC server) 230. The control API 216 could log in for this, for example as an additional "view" for the service components controlled by it. According to the invention, the sink WebRTC server 230 can signal the source WebRTC server 130 via a suitable implicitly or explicitly expanded connection protocol 400, which adequately displays the "RemoteMedia{suspend|resume}" function 219, to resume the use of individual service components. The source WebRTC server 130, via its local control API 116, can then again tell the corresponding data source 110 (e.g., via the device API: getUserMedia 119) to initiate, suspend, continue, or resume data transmission, decrease or increase the data density, mask the data stream with a replacement medium or replace a masking with the original data stream, etc. In other words, if necessary a reduced medium or replacement medium is provided in order to prevent possible connection termination due to inactivity. This means that an explicit expansion of the protocol used, according to the invention, has the advantage that affected components are only suspended or can be quickly reactivated, without the connection (for example today as planned via SDP:Offer/Answer) having to be reestablished, and thereby the related wait time can be reduced.

The controller "C" according to the invention, e.g., the MVC 214, has an overview of which service components are active and can therefore generate sensible combinations according to the invention. By additional connection to hard and/or soft sensors (260, 270, 280) in the terminal device or monitoring connections in the infrastructure, information about actual available bandwidths and service quality can be provided. The controller "C" can thereby further optimize sensible combinations of service components, in which, for example, the video component is switched off or, for example, a (latest) image of the view "V" is transmitted, that was also generated and stored previously at regular intervals in the model "M," and only the audio component is used.

The components of the expanded client-side MVC 214 according to the invention, except for the controller "C," can also be distributed via a backend server, for example via the http/Web server 220.

As described, the client-side application logic in the browser can be achieved by JavaScript download. Alternatively, the application server provides it and interacts with the client-side implementation of the MVCs.

With respect to the features of the invention described in the embodiments shown, such as the expansion of the MVC model 214 according to the invention on the side of the sink-side WebRTC app 213, they can exist in other embodiments and/or variations of the invention, for example in addition or as an alternative to expansion of the MVC model 114 on the side of the source-side WebRTC app 113 for source-side detection of the maximum data density that can be processed on the sink side, except when stated otherwise or when impossible for technical reasons.

We claim:

1. A method for controlling adaptation and transmission of multimedia data to a remote sink, comprising:
   receiving and decoding a message from the remote sink, the remote sink including a control application programming interface (API), the control API connected to a device API and a WebRTC-enabled API;
   evaluating the message to detect an operating status of at least one service component affecting output of multimedia data for a multimedia application at the remote sink side based on the operating status of the at least one service component detected from the evaluating of the message;
   adapting multimedia data for the multimedia application of the remote sink based on the operating status of the at least one service component detected from the evaluating of the message by at least one member selected from the group consisting of:
   (a) terminating, suspending, resuming, or initiating a data stream of the multimedia data; and
   (b) changing a transmission path for sending the data stream to the remote sink.

2. The method of claim 1, wherein an application to which the WebRTC-enabled API is assigned is implemented in a WebRTC-enabled web browser.

3. A method for controlling a multimedia application, wherein multimedia data from the multimedia application are transmitted from a source domain to a sink domain, received by the sink domain, and processed for display on a screen of a terminal device of the sink domain, wherein the multimedia data are adapted and/or transmitted depending upon an operating status of at least one service component of the terminal device affecting an output of the multimedia data, the method comprising:
   detecting an operating status of at least one service component of the terminal device related to a presentation of the multimedia data via a device application programming interface (API), a control API of the terminal device connected to the device API and a WebRTC-enabled API;
   generating status information characterizing an operating status of the at least one service component;
   generating a message that comprises at least one of:
   the status information; and
   a characterization of the status information, which characterizes a maximum data density processable for presenting the multimedia data based on the operating status of the service component; and
   an instruction to the remote source with respect to adapting the multimedia data to the terminal for adapting the multimedia data to be sent to the terminal device based on the operating status of the service component;
   transmitting the message to the remote source;
   the remote source adapting the multimedia data based on the message;
   the terminal device receiving the adapted multimedia data; and
   the terminal device processing the adapted multimedia data for output to at least one user via the terminal device.

4. The method of claim 3, wherein the terminal device is a mobile device and the remote source comprises a computer device having a processor and a non-transitory computer readable medium.

5. The method of claim 4, wherein the service component is a peripheral device connectable to the terminal device via the device API.

6. The method of claim 5,
   wherein the control API performs the generating of the message based on input received from the device API.

7. The method of claim 6, wherein the message includes the status information and the instruction indicates that a data stream of the multimedia data is no longer needed.

8. The method of claim 7, wherein the remote source adapting the multimedia data based on the message comprises the remote source suspending transmission of the data stream that is no longer needed in response to the received message.

9. The method of claim 6, wherein:
   the message includes the status information and the instruction indicates that a data stream of the multimedia data is resumable;
   wherein the remote source adapting the multimedia data based on the message comprises the remote source resuming transmission of the data stream in response to the received message.

10. The method of claim 6, wherein:
    the message includes the status information and the instruction indicates that a data stream of the multimedia data is to be sent at a reduced data density;
    wherein the remote source adapting the multimedia data based on the message comprises the remote source reducing a data density of the multimedia data in response to the received message.

11. The method of claim 3, wherein the terminal device is a smartphone, a tablet, a laptop, or a computer device.

12. The method of claim 11, wherein the at least one service component comprises a peripheral device connectable to the terminal device via the device API.

13. The method of claim 12,
    wherein the remote source adapting the multimedia data based on the message includes the remote source resuming transmission of a data stream, the peripheral device being associated with collecting data of the data stream for the resuming of the transmission of the data stream.

14. The method of claim 12, comprising:
    the remote source adapting the multimedia data based on the message includes suspending transmission of a data stream that is no longer needed and switching off a media stream of the peripheral device, the peripheral device being associated with collecting data of the data stream that is no longer needed.

* * * * *